Dec. 17, 1968 W. V. BEST ET AL 3,416,890
PROCESS OF PRODUCING OXIDES OF METALS AND METALLOIDS
Filed Dec. 16, 1965
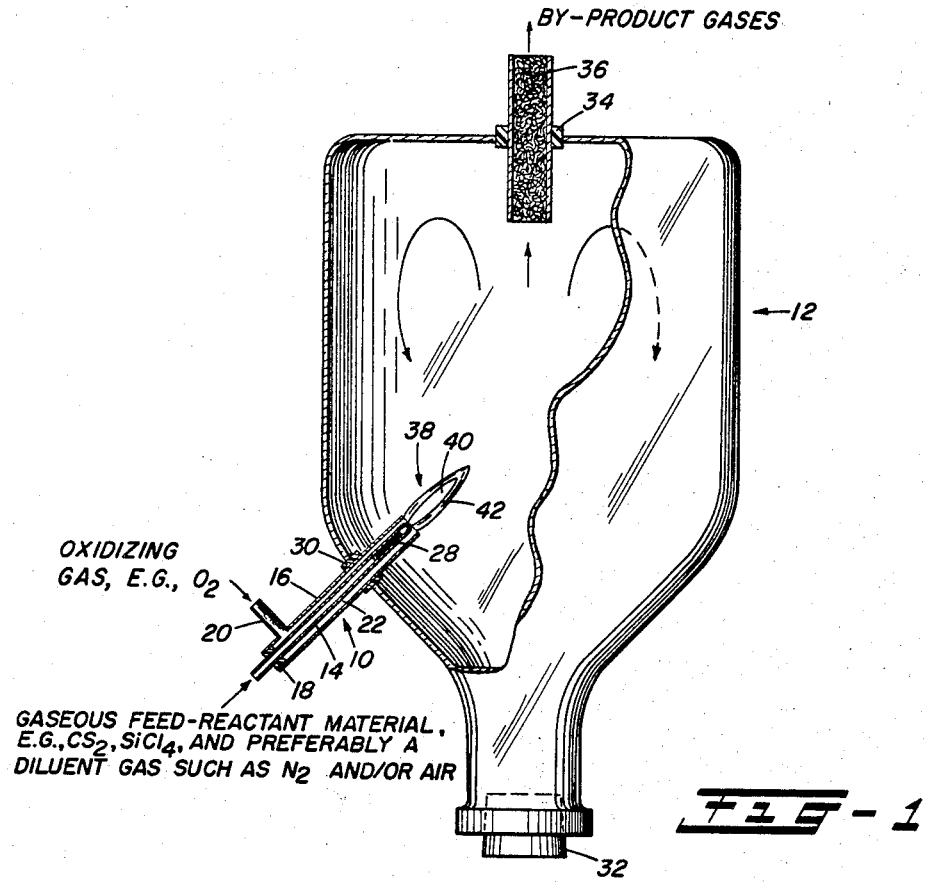
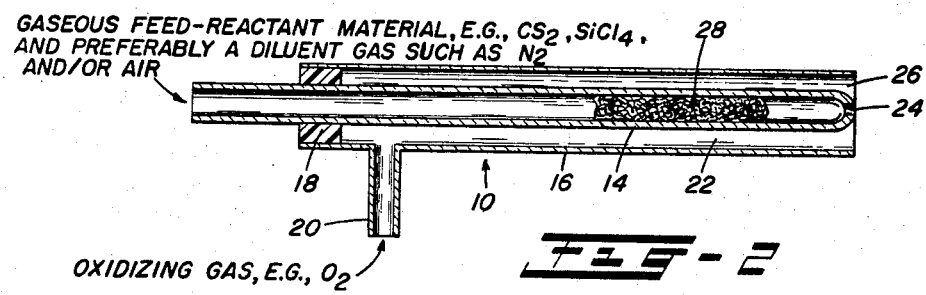
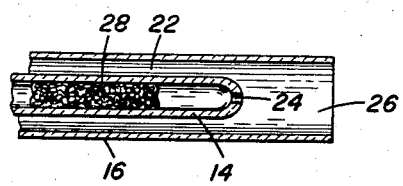
INVENTORS.
WILLIAM V. BEST
ROLAND L. HUGHES
BY *W. A. Schaich*
*Richard D. Heberling*
ATTORNEY

United States Patent Office 3,416,890
Patented Dec. 17, 1968

3,416,890
PROCESS OF PRODUCING OXIDES OF METALS AND METALLOIDS
William V. Best, Independence, Mo., and Roland L. Hughes, Leawood, Kans., assignors to Owens-Illinois, Inc., a corporation of Ohio
Filed Dec. 16, 1965, Ser. No. 514,314
11 Claims. (Cl. 23—182)

ABSTRACT OF THE DISCLOSURE

There is disclosed a process for preparing finely divided metal or metalloid oxides by the decomposition of a metal or metalloid perhalide in a flame produced by the combustion of an oxidizing gas and an auxiliary fuel consisting of a hydrogen-free compound containing sulfur bonded directly to carbon. Typical auxiliary fuels include carbon disulfide, carbon selenide sulfide, and carbon thiophosgene. The process is especially suitable for preparing finely divided silica. The prepared oxide, e.g. silica, is also suitably calcined after recovery from the flame.

---

This invention relates broadly to the art of producing oxides in finely divided state, and more particularly oxides of metals and metalloids including, for example, finely divided oxides of silicon, titanium, germanium, aluminum and boron. Still more particularly, the aforesaid finely divided oxides are derived from at least one perhalide (e.g., two, three, or any desired higher number of perhalides) selected from the group consisting of volatile (volatilizable) perhalides of metals and metalloids.

By practicing this invention finely divided oxides, especially silica, having the unobvious properties and combination of properties hereafter more fully described are obtained. For example, silica and other oxides prepared by the method of our invention are unique in that they contain no detectable (if any) hydroxyl groups in their molecular structure when they are produced under optimum conditions of preparation wherein both the preparation-system and the feed materials are moisture-free (substantially moisture-free). The scope of the invention includes both composition and method features.

It was known prior to the present invention that perhalides of metals and metalloids, e.g., silicon tetrachloride, could be hydrolyzed and dehydrated in an oxyhydrogen flame to produce a finely divided oxide of the metal or metalloid, specifically finely divided silica. Prior to the invention disclosed and claimed in our copending application Ser. No. 412,614, filed Nov. 20, 1964, the fuel commonly used in such flame-type reactions was hydrogen or a volatile hydrocarbon, e.g., a gaseous alkane. The prior-art burners employed or suggested for use in producing the flame have been devices of the so-called turbulent burner design (see, for example, U.S. Patent No. 2,990,249, dated June 27, 1961, and the brief description of the prior art in the second paragraph). One of the embodiments of the invention claimed in our aforesaid copending application was directed to a particular design of a burner which obviated certain disadvantages of the prior-art burners and made it possible to produce, for example, very finely divided silica having a lower content of total metal-oxide impurities than previously had been commercially available.

The present invention differs from the prior art and the invention disclosed and claimed in our aforementioned copending application in that, for example, a different fuel is included in the feed. (This "different" fuel is sometimes referred to hereafter in the specification and in the claims as an "added" or "auxiliary" fuel.) The invention makes it possible to oxidize directly a perhalide of a metal or metalloid in a flame to the corresponding oxide without forming a hydroxyl derivative as an intermediate or final reaction product. Furthermore, the method features of the invention can be practiced utilizing either premix- or diffusion-type burners.

More particularly it may be stated that the instant invention is based on our discovery that finely divided crude or "raw" (i.e., uncalcined or unrefined) oxides of metals and metalloids, specifically silica as an example, can be prepared by a flame reaction wherein the fuel employed increases the temperature of the flame (i.e., above that conventionally obtainable). More particularly, this fuel is a hydrogen-free compound containing sulfur bonded directly to carbon. Typical examples of such compounds are carbon disulfide, carbon selenide sulfide (CSeS), and carbon thiophosgene ($CSCl_2$).

For economical and other reasons we prefer to use $CS_2$ as the fuel. Hence in the following descriptions of the invention carbon disulfide will, for purpose of brevity and simplicity, most generally be referred to in this respect even though, as will be clearly understood by those skilled in the art, other compounds containing sulfur bonded directly to carbon may be employed in place of all or part of the carbon disulfide.

Taking the preparation of finely divided silica as illustrative of the oxide, such a material is produced in accordance with this invention by the direct oxidation of a silicon tetrahalide, specifically silicon tetrachloride, admixed (e.g., premixed) with carbon disulfide vapor. A suitable inert gas, e.g., argon, helium or, preferably, nitrogen, may be employed as a carrier gas for this mixture. However, the carrier gas is not essential and may be omitted, for example by employing a premix type of burner, the mixing chamber of which is heated above the boiling point of the feed materials; or by using a diffusion type of burner in which the burner itself is heated above the boiling point of the feed materials. Sufficient oxygen and/or air is supplied to completely oxidize the $CS_2$-$SiCl_4$ vapor mixture to, for example, sulfur dioxide and/or sulfur trioxide, carbon dioxide, silicon dioxide and chlorine.

One of the advantages of using a fuel comprising a hydrogen-free compound containing sulfur bonded directly to carbon, specifically $CS_2$, in practicing this invention is its high inflammability in the absence of water or hydrogen, and its high heat of combustion (about 250 kcal./mole).

Other advantages in the use of $H_2$-free, S-containing carbon compounds, specifically $CS_2$, may be summarized as follows:

(1) $CS_2$ has a high burning velocity even in the absence of hydrogen or of —OH radicals.

(2) The volatility of combustion products of $CS_2$, viz., $SO_2$ and $CO_2$.

(3) The miscibility of $CS_2$ (B.P. ca. 46° C.) with $SiCl_4$ (B.P. ca. 56.5° C.).

(4) Its high flammability. $CS_2$ mixed with air needs approximately 5 volumes of $CCl_4$ to yield a mixture that is nonflammable in air. This high flammability of $CS_2$ permits the maintenance of a continuous flame in the presence of large quantities of $SiCl_4$.

Primarily the $CS_2$ serves as a highly efficient internal heating source to elevate the silicon tetrachloride vapor to a temperature of, for example, from about 700° to 1000° C. at which direct oxidation of $SiCl_4$ in the presence of oxygen can occur. In other words, the instant invention provides finely divided raw silica (among other oxides of metals and metalloids) with little, if any, water content by the direct oxidation of $SiCl_4$ vapor with excess $O_2$ in a high-temperature flame zone, and wherein the reaction zone is maintained in an "ignited" state by the introduction of $CS_2$ vapor admixed, specifically premixed, with $SiCl_4$ vapor. The further possibility exists that partially oxidized $CS_2$ produces free radicals, e.g., $S_2°$, which may catalyze the direct oxidation of $SiCl_4$ to $SiO_2$ by unknown mechanisms.

Another advantage in the use of a hydrogen-free auxiliary fuel in a process wherein an oxide of a metal or metalloid is produced in a flame reaction is that ordinarily there is no clogging of the burner tips with the aforesaid oxide, e.g., finely divided $SiO_2$. This is due to the fact the added fuel, e.g., $CS_2$, is free from hydrogen. Hence longer runs may be made without the necessity for closing down or altering the operation while the burners are cleaned.

Finely divided raw silica, prepared in accordance with this invention on a laboratory-size scale, contains various oxides of sulfur and other by-products of the flame reaction. In the case of finely divided raw titania, qualitative chemical analysis indicated the presence of Cl, $SO_2$, $SO_3$ and of sulfite and sulfate anions, uncombined and/or combined chemically.

To remove the by-products, which generally constitute at least 5%, e.g., from about 10% to about 60%, by weight of the crude oxide-containing compositions of the invention, the crude or raw initial product is usually calcined. In the case of raw silica a minimum calcination temperature of about 400° C. is needed to remove the extraneous products of formation. A typical pH of a 0.1% suspension of a crude silica of this invention is about 2.8, while a typical pH of a slurry of the corresponding calcined silica of the same concentration is about 7.2. (The pH of a 0.1 suspension of a commercially available finely divided silica, hereafter for purpose of brevity often designated as C.A.-Sil and which is understood to be produced from $SiCl_4$ by an oxyhydrogen flame reaction, is 5.1.) At a temperature of 480° C., a typical period of time to complete the calcination of silica produced in accordance with the present invention, and which for purpose of brevity is hereafter referred to as $CS_2$-Sil, is about 8 hours for a ½-lb. bulk quantity of the crude silica.

The preparation of $CS_2$-Sil can be controlled to produce a wide variety of sizes and ranges of sizes of particles, e.g., from about 0.01 micron to 0.2 micron and higher. Thus, calcined $CS_2$-Sil has been produced on a small scale showing a range between 0.02 and 0.12 micron with the majority, more particularly about 60%, ranging between 0.02 and 0.04 micron.

The calcined silicas of the invention properly may be described as "ultrapure" silicas. Analyses indicate that they show nearly as low an impurity level of metals and metalloids as silica prepared by the oxyhydrogen process. B.E.T. surface areas of from about 70 to about 100 m.$^2$/g. are typical.

At 50% relative humidity (R.H.) the moisture-absorptive properties of C.A.-Sil and calcined $CS_2$-Sil are very similar to each other. However, at 95% R.H. the C.A.-Sil absorbs 40% moisture while calcined $CS_2$-Sil absorbs less than 15%. This is strongly indicative of structural differences between the two silicas that are different in kind and not merely in degree. Furthermore, the lower moisture-absorptive characteristic of the $CS_2$-Sil is a matter of considerable practical importance and significance. For example, under high-humidity storage conditions the $CS_2$-Sil would be more stable and would require a less expensive package.

Substantial physical and/or chemical differences between C.A.-Sil and $CS_2$-Sil are also evidenced by the following results upon testing the two silicas.

When C.A.-Sil is added to kerosene, a clear gel is formed. However, when calcined $CS_2$-Sil is added to kerosene, the gel has a definite pink color. When a trace of water is added to the pink gel, the pink color disappears. This indicates a difference in the opticophysical properties of the calcined $CS_2$-Sil from C.A.-Sil.

It was also noted that $CS_2$-Sil (both crude and calcined) does not have the "clinging" fluffy characteristic of C.A.-Sil or of finely divided ultrapure silica produced in an oxyhydrogen flame as described in our aforementioned copending application Ser. No. 412,614.

One of the most significant distinctions between $CS_2$-Sil and C.A.-Sil is the substantially lower sintering temperature of the former as compared with the latter. For example, finely divided $CS_2$-Sil can be sintered into a somewhat clear or translucent glass by heating in vacuum at about 1370° C. for from 15 to 30 minutes. Under these same heating conditions the C.A.-Sil particles show no evidence whatsoever of any sintering together to a solid mass, and a much higher temperature, e.g., of the order of 1700° to 1750° C., is generally necessary before such sintering to a solid mass is obtained. The melting point of crystobalite silica is 1710° C. Additionally, the higher bulk density of the $CS_2$-Sil particles makes them easier to press into shapes for sintering them is the case with the lower bulk density C.A.-Sil particles, which are much more difficult to compact.

$CS_2$-Sil is also harder and more abrasive than C.A.-Sil. This was noted when the respective silicas were suspended in varnish using a steel-shot mill. During the formation of the suspensions it was noted that the $CS_2$-Sil removed more iron from the shot and the metal container than did the C.A.-Sil. This abrasive characteristic of the $CS_2$-Sil suggests its use as an abradant in polishes, metal-polishing compounds and other types of abrasive cleaners used to obtain a fine finish on surfaces. Either the crude or the calcined silicas of this invention can be used as abradants or as components of abradant compositions. They also can be used, for instance, as thickeners of fluids, e.g., liquid hydrocarbons.

The novel features of the invention are set forth in the appended claims. The invention itself, however, will best be understood from reference to the following more detailed description when considered in connection with the accompanying drawing, which is illustrative of preferred embodiments of the invention, and wherein FIG. 1 is an isometric view, partly broken away and partly in section, of suitable apparatus including burner and collection elements for use in practicing the instant invention, and showing the flame at the end of the burner;

FIG. 2 is an enlarged, longitudinal, sectional view of the burner illustrated in FIG. 1; and FIG. 3 is a similar view of the forward end of a modification of the burner shown in FIG. 2.

The invention will be described for purpose of illustration with particular reference to the preparation of finely divided (ultrafine) silica and which, in its ultimate or refined form, is also ultrapure. It will be understood, of course, by those skilled in the art that the invention is equally applicable to the production of other oxides of metals and metalloids, more particularly oxides derived from one or more volatile perhalides (particularly the volatile perchlorides, perbromides and periodides) of metals and metalloids, e.g., oxides of titanium, germanium, boron, aluminum and tin. For economic and other reasons it is preferred to use volatile perchlorides of metals and metalloids in practicing the instant invention.

Referring now to the accompanying drawing, there is shown in FIG. 1 by way of illustration apparatus suitable for use in making oxides of the kind with which this invention is concerned. This apparatus includes a suitable burner, e.g., a diffusion-type burner such as the burner 10, and a suitable collection means 12.

The burner 10 consists essentially of inner and outer, concentric (spaced-apart), feed-reactant tubes 14 and 16, respectively. These tubes are constructed of high temperature-resisting tubing, e.g., fused silica tubing. Inner tube 14 is rigidly but detachably held in position within tube 16 by sealing means 18 which, in small-scale apparatus, conveniently may be a Teflon® polytetrafluoroethylene-coated rubber stopper provided with an opening for the closely-fitting passage therethrough of the inner tube 14.

The inner tube 14 extends rearward of the sealing means 18 and provides means through which gaseous feed-reactant material is charged to the said tube. When the product being made is ultrafine silica, the feed-reactant material charged to tube 14 may be, for example, a mixture of $CS_2$, $SiCl_4$ and a diluent gas such as $N_2$ and/or air; or merely volatilized $CS_2$ and $SiCl_4$ when tube 14 is electrically or otherwise heated. Care should be taken in the use of air as a diluent gas in order to avoid flashbacks, i.e., explosions.

At the rearward end of the burner 10 and before the sealing means 18, the outer tube 16 is provided with an inlet tube 20 through which an oxidizing gas, e.g., $O_2$ or a mixture of $O_2$ and air, passes concentrically (i.e., through the space 22) about the inner tube 14. With other types of burners, e.g., burners of the premix type, one may use 100% air instead of oxygen (substantially pure, dry oxygen) alone or instead of a mixture of oxygen and air. The tube 20 may be constructed of the same material of which tubes 14 and 16 are constructed, e.g., fused silica tubing.

Inner tube 14 is provided at its forward end with an orifice 24 (FIGS. 2 and 3) while outer tube 16 is open at its forward end as indicated at 26. When tube 14 is constructed of tubing of, for instance, 4 mm. I.D., the diameter of orifice 24 advantageously is about 2 mm. In such a case outer tube 16 may have an I.D. of, for example, about 8 mm.

A suitable flash-back preventor, e.g., a silica-fiber gauze such as quartz wool or any other flash-resistant gauze, advantageously is inserted near the forward end of inner tube 14 as indicated in the several figures of the drawing. In this way the possibility of a flash-back is obviated. A similar flash-back preventor (not shown) also may be inserted in the tube 20, e.g., near the point where it enters the space 22.

In the modification shown in FIG. 3 the end of the inner tube 14 is a short distance within the end of the outer tube 16, e.g., a distance about 10 to 15% the length of the tube 16. In general such a modification, especially when used in the production of ultrafine silica, is less satisfactory than when the end of the tube 14 is flush with the end of the tube 16. This is because of the increased tendency of the orifice 24 to become clogged with silica when the modification of FIG. 3 is employed. However, this modification may be quite satisfactory in the preparation of other ultrafine oxides, e.g., oxides of metals and metalloids having a fusion or sintering point higher than that of $SiO_2$.

Tube or arm 20 and the rear end of tube 14 may be connected, respectively, by any suitable means to a source of an oxidizing gas, more particularly an oxygen-containing oxidizing gas, e.g., $O_2$, and to a source of the aforementioned gaseous feed-reactant material. The tubes leading to the supply sources may be made of, for example, a polyolefin, specifically polyethylene; and they may be joined to the fused silica tubes 14 and 20 by fittings made, for instance, of a poly(perhalogenated)hydrocarbon, e.g., Teflon polytetrafluoroethylene.

The collection unit 12 of the apparatus may take the form illustrated in FIG. 1, namely, an inverted carboy. Such a carboy may be made of, for example, a borosilicate glass.

Suitable sealing means such as plugs 30, 32 and 34 are employed to seal the forward portion of the burner and the flame (with plug 30), and the lower and upper openings in the collection unit (with plugs 32 and 34, respectively), from the outer atmosphere. Teflon polytetrafluoroethylene-coated rubber plugs are suitable sealing means for this purpose.

The by-product gases exit from the top of the product-collection unit through a tightly packed filter 36 containing a suitable filtering medium, e.g., glass wool.

During operation of the apparatus, preferably a diluent gas, e.g., nitrogen, argon, helium, air, or mixtures of such gases in any proportions, is passed through an electrically or otherwise heated saturator (i.e., a gas saturator bottle), e.g., a borosilicate glass saturator, containing a mixture of dry $CS_2$ (or other dry hydrogen-free, sulfur- and carbon-containing compound of the kind used in this invention) and a volatile, anhydrous (substantially completely anhydrous) perhalide of a metal or metalloid, specifically electronic-grade $SiCl_4$. The saturator temperature when charging a mixture of $CS_2$, $SiCl_4$ and $N_2$ and/or air to the tube 14 is generally less than 40° C., e.g., from 20° C. to 30° C. When the $CS_2$-$SiCl_4$ mixture volatilizes, a certain heat of evaporation must be supplied to maintain the temperature of the liquids contained in the saturator. An electric heater is a convenient means for supplying heat to the saturator in order to maintain the aforementioned temperature.

The oxygen-containing oxidizing gas, specifically $O_2$ in anhydrous (substantially completely anhydrous) state, is charged through inlet tube 20 into the space 22 surrounding inner tube 14.

The gaseous feed-reactant material passing through orifice 24 of the tube 14 and the oxidizing gas leaving the open end of the tube 16, as indicated at 26, are ignited to form the flame 38 with its inner reaction zone 40, which is surrounded by an oxidizing gaseous, specifically $O_2$, cone 42.

The gaseous feeds to inner tube 14 and outer tube 16 are passed through these tubes under a low pressure of up to about 5 p.s.i.g. The pressure of the reactant feed-material entering the tube 14 and exiting through the orifice 24 is a little higher than that of the oxidizing gas entering the tube 16 and exiting at the open end 26 of the tube. The result is a "blowpipe" type of flame as indicated at 38 wherein the oxygen cone 42 completely surrounds the stream of gaseous $CS_2$ plus $SiCl_4$ plus $N_2$ and/or air. Oxidation of the $SiCl_4$ in the latter stream occurs at the interface and within the oxygen cone 42, for instance in the reaction zone 40.

From the foregoing description of the apparatus including the collection system, and of the operation of the burner, it will be noted that the complete unit is under a slight positive pressure thereby excluding external atmospheric gases.

Collection of the crude oxides, e.g., crude silica, initially produced occurs on the inner surfaces of the collection carboy by a combination of the mechanisms of agglomeration, gravitational settling, impingement and mechanical filtration. The product is collected at or near ambient temperature. The crude silica produced in accordance with this invention does not adhere to the inner surfaces of the collection unit as do those silicas produced in an oxyhydrogen-silicon tetrachloride or an air-hydrogen-silicon tetrachloride flame. The crude product is removed from the unit at the end of the run by any suitable means, for instance with the aid of a scraper such as a polyethylene scraper, and is stored in suitable receptacles, e.g., moisture-free polyethylene or glass containers such as those made of soda-lime-silica glass.

Proportions of feed materials

Again for purpose of illustration taking ultrafine silica as the oxide to be produced from feed materials including $CS_2$ and a silicon perhalide, specifically $SiCl_4$, it may be stated that from theoretical considerations the products of complete combustion of $CS_2$, $SiCl_4$, air and/or oxygen should be $SiO_2$, $CO_2$, $SO_2$ (and/or $SO_3$), and $Cl_2$. On the other hand, when insufficient oxygen is present or operating conditions are such that incomplete combustion occurs, the oxidation products of a $CS_2$-$SiCl_4$-air and/or oxygen flame may be phosgene, thiophosgene, silicon sulfide and certain other compounds. Since some of these oxidation products resulting from incomplete combustion are extremely toxic, it is important from the standpoint of avoiding a health hazard to the operator that the proportions of ingredients in the feeds are adjusted and the burner is designed to attain complete (or almost complete) combustion of the toxic-forming feed materials.

We have learned from our investigations utilizing the diffusion-type burner illustrated in the accompanying drawing that, in the absence of $H_2$ or water vapor, mixtures of $SiCl_4$, $CS_2$ and air apparently do not attain sufficiently high temperatures to effect complete oxidation of $SiCl_4$ to $SiO_2$, since only traces of $SiO_2$ are obtained. Using this type of burner we further found that by employing $O_2$ (instead of air) in excess of the amount necessary for complete reaction to produce $SiO_2$, then a mixture of $CS_2$ and $SiCl_4$ vapors could be ignited to produce a finely divided silica even in the absence of $H_2$ or water vapor. However, with other types of burners such as those of the premix type, one may use air alone, or a mixture of air and oxygen in any proportions as the oxidizing gas.

When, for example, $SiCl_4$ is the perhalide reactant in carrying out the process of the invention, the flow conditions are preferably kept as close as possible to a ratio of 1 mole of silicon tetrachloride to at least 0.2 mole, e.g., from 0.2 to about 3 or 4 (preferably about 1 or 2) moles of $CS_2$, and to a proportion of $O_2$ in molar excess of that required theoretically to oxidize completely (substantially completely) all the $SiCl_4$ to $SiO_2$ and all the $CS_2$ to $CO_2$ and sulfur oxides, e.g., $SO_2$ and/or $SO_3$. Thus, when using 0.2 mole $CS_2$ per mole of $SiCl_4$, the molar amount of $O_2$ may be, for example, from about 2 to about 40 moles, and more particularly from about 3 to about 20 or 30 moles, per mole of $SiCl_4$. The amount of nitrogen, argon, helium or other diluent gas that is used as a carrier for the $CS_2$ and $SiCl_4$ is not critical from a reaction standpoint except that the relative amount should not be so great as to make difficult the maintenance of a suitable flame and the production of a satisfactory yield of $SiO_2$. Usually such inert gases as nitrogen are employed in a molar ratio of from 2 to 6 moles, more particularly from 2 to 3 or 4 moles, of such an inert gas per mole of total $SiCl_4$ plus $CS_2$. If and when air is used alone or admixed with nitrogen or other inert gas as a diluent gas for the $SiCl_4$ plus $CS_2$, then the amount of oxygen present in the air is normally taken into consideration in determining the aforementioned amount of $O_2$ required to effect complete combustion of the $SiCl_4$ to $SiO_2$ and the $CS_2$ to $CO_2$ and $SO_2$ (and/or $SO_3$).

Typical properties of $CS_2$-Sil (both crude and calcined) and of C.A.-Sil are summarized in Table I.

TABLE I

| Property | Raw $CS_2$-Sil | Calcined $CS_2$-Sil | C.A.-Sil |
|---|---|---|---|
| Bulk density, avg. lb./cu.ft. | 2.728 | 2.902 | 2.128 |
| Specific gravity | 2.11 | 2.40 | 2.38 |
| pH, 0.1% suspension | 2.80 | 7.2 | 5.1 |
| Avg. particle size, $\mu$ | 0.056 | 0.042 | 0.015 |
| Calculated surface area, meters/gm. | 42 | 56 | 193 |
| Physical state | amorphous | amorphous | amorphous |
| 7-day moisture absorption, 50% R.H. | 8.75 | 1.45 | 2.06 |
| 7-day moisture absorption, 95% R.H. | 82.10 | 14.65 | 38.70 |
| Percent Silica to give a thin gel with kerosene | 10 | 10 | 8 |
| Percent Silica to give a thin gel with toluene | 10 | 9 | 7.5 |
| Percent Silica to give a thin gel with 95% ethanol | 33⅓ | 20 | 10 |
| Percent Silica to give a thin gel with water | 29 | 29 | 25 |
| Percent Silica to give a flat varnish with specular gloss of 16 | | 19 | 12 |

The properties referred to in Table I were determined as follows:

(1) Bulk density.—Bulk density was determined by a modification of ASTM designation D-1513-60. The method was modified as follows: The initial density was determined on the product immediately after allowing it to flow in the container. The container was then vibrated by tapping the bottom on a cloth pad until the material would compact no more (75 to 150 taps). The maximum and minimum bulk density for the product was then calculated from the change in volume.

(2) Specific gravity.—The specific gravity was determined by ASTM designation D-153-54. This determination was made at 77° F. (25° C.). The fluid used was white kerosene with a density of 0.807 g./ml.

(3) pH.—The pH of a water suspension of the various silica products was determined by means of a Beckman Model N pH meter.

(4) Particle size and surface area.—The particle size and surface area were determined from electron photomicrographs. The magnification was 75,000 times. Particle size was determined from the electron photomicrographs by direct measurement. To accomplish this, a grid was devised for locating representative areas. A total of 300 particles was measured in order to establish the size distribution. Surface area and particles per gram were determined by calculation.

(5) Physical state.—The physical state of the material was determined by electron diffraction.

(6) Gelling and thickening properties.—The gelling and thickening properties of raw and calcined $CS_2$-Sil were compared with C.A.-Sil in various representative solvents, specifically kerosene, toluene, ethyl alcohol (95%) and water. The thickening effect with these solvents was described by visual observations.

The viscosity of calcined $CS_2$-Sil and C.A.-Sil was measured by means of a Brookfield viscosimeter from a thin gel state to a liquid state. The suspensions are thixotropic. Hence the normal procedure was changed as follows:

Two hundred (200) ml. of the suspension was thoroughly mixed, and the rotor of the motor was submerged to the proper depth. After one minute the rotor was started and allowed to run for two minutes. At the end of the two-minute period the viscosity reading was taken. The temperature at which these determinations were made was 70° F. The results are summarized in Table II.

TABLE II.—VISCOSITY OF SILICA SUSPENSIONS IN KEROSENE

| Composition, Percent | | Viscosity in Centipoises | |
|---|---|---|---|
| Silica | Kerosene | Calcined $CS_2$-Sil | C.A.-Sil |
| 5.84 | 94.16 | 345 | 390 |
| 4.45 | 95.55 | 240 | 290 |
| 3.36 | 96.64 | 148 | 145 |
| 2.54 | 97.46 | 81 | 86 |
| 1.91 | 98.09 | 40 | 41 |
| 1.45 | 98.55 | 17.0 | 19.6 |

From the foregoing description it will be seen that the present invention provides compositions comprising at least one oxide (e.g., one, two, three, or more oxides) of the group consisting of metal and metalloid oxides. The oxide material (at least as initially produced) is in finely divided state, and has the characteristic of oxide(s) obtained by direct oxidation in a flame of at least one volatile perhalide of the corresponding metal or metalloid. The aforesaid flame whereby the oxide(s) are produced results from the combustion of non-water-forming combustible gases. The crude oxide(s) have volatile by-products associated therewith including those resulting from utilizing in the above-described flame a volatile compound containing sulfur bonded directly to carbon, and by which carbon disulfide is specifically meant. The by-products briefly described above and more fully elsewhere in this specification ordinarily constitute at least about 5% by weight of the composition.

The invention also provides finely divided materials consisting essentially of at least one metal or metalloid oxide, which material has the characteristics obtained by calcining a composition of the kind described in the preceding paragraph at a temperature and for a time sufficient to remove the by-products mentioned, for example, in the preceding paragraph.

To be more specific, it may further be stated that the instant invention provides calcined, finely divided silica which is the product of calcination of crude silica under the time and temperature conditions set forth in the previous paragraph. This crude silica has the characteristics of one that has been produced by direct oxidation in a flame of silicon tetrachloride. This flame results from the combustion of non-water-forming combustible gases. The crude silica has volatile by-products associated therewith including those resulting from utilization of carbon disulfide in the aforesaid flame. The preferred, calcined, finely divided silicas of the invention are additionally characterized by a sintering temperature within the range of from about 1100° C. to about 1400° C. Other and more detailed characteristics of $CS_2$-Sil have been given hereinbefore, especially in comparison with C.A.-Sil.

In order that those skilled in the art may better understand how the present invention can be carried into effect, the following examples are given by way of illustration and not by way of limitation. All parts and percentages are by weight unless otherwise stated.

Example 1

This example illustrates the preparation of finely divided raw silica by the direct oxidation of $SiCl_4$ vapor premixed with $CS_2$ vapor using apparatus which is essentially the same as that illustrated in FIGS. 1 and 2 and in the manner previously described with reference to said figures. Nitrogen is employed as a diluent or carrier gas for this mixture. The amount of oxygen employed is in large excess of the stoichiometric amount required for the complete oxidation of the vaporous mixture of $CS_2$ and $SiCl_4$. The preparative-system and the feed materials are moisture-free (substantially moisture-free).

Data illustrative of operating parameters that may be used in the preparation of the raw silicas of this invention are given in Table III. These runs were not made under optimum economical operating conditions.

The raw silica product is white in color when collected. During heating in air, e.g., at about 500° C., the raw silica darkens and evolves volatile and/or combustible by-products of the reaction. As these by-products are evolved, the silica again becomes white in color. Electron micrographs of representative samples from runs shown in Table III indicate that the ultimate particle size is less than 40 m$\mu$ with an aggregate size of about 1$\mu$.

Example 2

Same as in Example 1 with the exception that it includes runs showing other operating parameters that are useful in practicing the invention. Electronic grade of silicon tetrachloride and "ultradry" grade of oxygen are employed. Analytical reagent grade of $CS_2$ is used in Runs E-27 and E-42, and "spectroanalyzed" grade in all other runs. The operating conditions are given in Table IV.

TABLE IV

| Run No. | SiCl₄ ml. | SiCl₄ moles | CS₂ ml. | CS₂ moles | N₂ c.f.h. | N₂ moles | O₂ c.f.h. | O₂ moles | Time, min. | Crude Silica, g. |
|---|---|---|---|---|---|---|---|---|---|---|
| E-12 | 45.0 | 0.39 | 50.0 | 0.83 | 1.0 | 2.84 | 10 | 14.2 | 135 | 13.0 |
| E-13 | 45.0 | 0.39 | 50.0 | 0.83 | 1.5 | 3.52 | 10 | 17.1 | 105 | 8.5 |
| E-14 | 45.0 | 0.39 | 50.0 | 0.83 | 1.0 | 2.53 | 10 | 12.7 | 120 | 16.0 |
| E-17 | 45.0 | 0.39 | 50.0 | 0.83 | 1.0 | 1.89 | 8.5 | 8.1 | 90 | 8.7 |
| E-19 | 45.0 | 0.39 | 50.0 | 0.83 | 1.0 | 2.74 | 10 | 13.7 | 130 | 10.0 |
| E-21 | 47.5 | 0.41 | 52.5 | 0.87 | 1.0 | 3.16 | 10 | 15.8 | 150 | 13.2 |
| E-22 | 47.5 | 0.41 | 32.5 | 0.54 | 1.0 | 2.21 | 10 | 11.1 | 105 | 9.5 |
| E-23 | 47.5 | 0.41 | 52.5 | 0.87 | 1.0 | 2.21 | 10 | 11.1 | 105 | 8.7 |
| E-24 | 47.5 | 0.41 | 52.5 | 0.87 | 1.0 | 3.05 | 10 | 15.3 | 145 | 16.0 |
| E-25 | 50.0 | 0.43 | 55.0 | 0.91 | 1.0 | 2.74 | 10 | 13.7 | 130 | 14.0 |
| E-26 | 47.5 | 0.41 | 52.5 | 0.87 | 1.0 | 2.63 | 10 | 13.2 | 125 | 13.8 |
| E-27 | 35.0 | 0.30 | 40.0 | 0.66 | 1.0 | 2.63 | 10 | 13.2 | 125 | 8.0 |
| E-32 | 48.0 | 0.42 | 52.0 | 0.86 | 1.0 | 2.84 | 10 | 14.2 | 135 | 8.3 |
| E-42 | 55.0 | 0.48 | 60.0 | 0.99 | 1.0 | 2.74 | 8 | 11.0 | 130 | 15.0 |
| E-47 | 55.0 | 0.48 | 60.0 | 0.99 | 1.0 | 2.63 | 10 | 13.2 | 125 | 19.5 |
| E-56 | 65.0 | 0.57 | 65.0 | 1.08 | 1.3 | 3.56 | 10 | 13.7 | 130 | 21.5 |
| E-58 | 65.0 | 0.57 | 65.0 | 1.08 | 1.0 | 2.74 | 10 | 13.7 | 130 | 22.0 |

Upon firing samples of crude silica products of some of the runs described in Table IV at about 1000° C. for 1 hour in the presence of air, the average weight loss of the desiccator-cooled samples is about 6%. This average weight loss of the crude silica varies widely due to the difficulty in maintaining constant operating parameters in carrying out relatively short runs in small-scale units. These parameters include collection, removal and storage techniques.

In Table V are summarized the results of analysis for metal and metalloid content (arc emission; parts per million) of samples of several of the runs included in Table IV and wherein the operating conditions under which they were prepared are described. It will be noted that silica prepared utilizing "spectro" quality $CS_2$ and electronic grade $CiCl_4$ is markedly purer, that is, it has a lower content of metal and metalloid, than silica prepared utilizing "reagent" (i.e., analytical reagent) grade of $CS_2$ and electronic grade $CiCl_4$. The values reported in the table are parts per million (p.p.m.) of metal or metalloid.

TABLE III

| Run No. | SiCl₄ ml. | SiCl₄ moles | CS₂ ml. | CS₂ moles | N₂ c.f.h. | N₂ moles | O₂ c.f.h. | O₂ moles | Time, min. | Crude Silica, g. |
|---|---|---|---|---|---|---|---|---|---|---|
| E-7 | 45 | 0.39 | 50 | 0.83 | 1 | 3.78 | 5 | 9.5 | 180 | 9 |
| E-8 [1] | 90 | 0.78 | 100 | 1.66 | 1 | 8.40 | 8 | 33.0 | 400 | 1 23 (15) |
| E-9 | 45 | 0.39 | 50 | 0.83 | 1 | 3.69 | 10 | 18.5 | 175 | 8 |
| E-10 | 45 | 0.39 | 50 | 0.83 | 1 | 2.95 | 10 | 14.8 | 140 | 9 |
| E-11 | 45 | 0.39 | 50 | 0.83 | 1 | 2.95 | 10 | 14.8 | 140 | 12 |

[1] Double-run E-8 fired over Bunsen burner.

TABLE V.—SUMMARY OF ANALYSIS OF SILICA SAMPLES FOR METAL AND METALLOID CONTENT (p.p.m.)

| Sample of Run No. | Al | Mg | Cu | Zr | Na | Ti | Ba | Mn | Fe | Ca | Ni | Cr | Zn | Pb | Ignition Loss, Percent |
|---|---|---|---|---|---|---|---|---|---|---|---|---|---|---|---|
| E-23 [1] | 0.5 | <0.4 | 0.4 | <0.4 | <10 | <0.4 | <0.4 | <2 | 3 | <2 | <1 | <1 | <5 | 2-20 | 11.9 |
| E-26 [1] | 0.3 | <0.4 | 0.5 | <0.4 | <10 | <0.4 | <0.4 | <2 | 0.8 | <2 | <1 | <1 | 4 | 2-20 | 11.5 |
| E-27 [2] | 82 | 5 | 0.4 | 0.6 | <100 | 5 | 2 | <2 | 7 | <10 | 0.8 | 0.8 | 3 | 2-20 | 11.7 |

[1] Spectro quality CS₂, electronic grade SiCl₄.   [2] Reagent grade CS₂, electronic grade SiCl₄.

Surface Area—B.E.T.: Unfired, 87 m.²/g.; fired (1,000° C.), 73 m.²/g.

The calcination loss of from 11.5 to 11.9% for the analyzed samples reported in Table V is due, in part, to loss of oxides of nitrogen as indicated by the color of the evolved gases and the odor. Volatile compounds such as chlorine, sulfur dioxide and/or sulfur trioxide are also by-products associated with the crude silicas of this invention, and are evolved upon calcination of the said silicas.

Example 3

Calcination runs were made on $CS_2$-Sil to determine the optimum time-temperature conditions to remove extraneous matter associated with the crude silica. The samples were heated in 25 x 50 mm. weighing bottles. The sample size was 0.43±0.03 g. The heating period was terminated at the end of 72 hours. One specimen, which was heated at 230° C., was terminated after 168 hours of heating; however, no change in solution pH was noted beyond the 72-hour period. The results are summarized in Table VI.

TABLE VI.—RESULTS OF VARYING CALCINATION CONDITIONS

| Time, Hrs. | 100° C. | | 230° C. | | 400° C. | | 480° C. | |
| --- | --- | --- | --- | --- | --- | --- | --- | --- |
| | Loss[1] | pH[2] | Loss[1] | pH[2] | Loss[1] | pH[2] | Loss[1] | pH[2] |
| 0 | | 2.8 | | 2.8 | 0 | 2.8 | | 2.80 |
| 2 | 1.8 | 3.0 | 4.8 | 3.1 | 3.3 | 3.1 | 10.3 | 5.35 |
| 4 | 2.5 | 3.3 | 3.0 | 3.5 | 4.7 | 4.1 | 12.0 | 6.90 |
| 8 | 2.7 | 3.3 | 3.1 | 3.7 | 6.2 | 5.4 | 13.0 | 7.20 |
| 16 | 3.1 | 3.4 | 3.3 | 3.9 | 10.1 | 6.2 | 13.5 | 7.30 |
| 24 | 3.2 | 3.4 | 3.4 | 4.1 | 11.0 | 6.8 | 13.5 | 7.30 |
| 48 | 3.2 | 3.4 | 3.5 | 4.3 | 12.0 | 7.2 | 13.6 | 7.30 |
| 72 | 3.2 | 3.4 | 3.5 | 4.4 | 12.1 | 7.2 | 13.6 | 7.30 |
| 168 | | | 3.6 | 4.4 | | | | |

[1] Percent weight.
[2] pH of a suspension of 0.1 g. silica per 100 ml. of distilled water.

The following examples are illustrative of the production of other oxides of metals and metalloids in accordance with the instant invention.

Example 4

This example illustrates the preparation of finely divided titania using a modified burner of the kind illustrated in FIG. 3 of the drawing accompanying this application. The inner tube 14 having a 2 mm. orifice is recessed about 0.5 to 3 cm. within the outer tube 16. This burner modification has some definite advantages in the preparation of finely divided titania on a relatively small scale. For example, with this arrangement one can obviate any tendency of clogging of the orifice of the central feed tube, such as is sometimes encountered in the operation of the burners described in Examples 1 and 2, and can utilize a collection system of the kind illustrated in FIG. 1. In other words, the burner can be completely sealed in the collection portion of the unit, thereby avoiding the necessity of preheating the burner to temperatures of the order of 100° C. or more in order to obviate clogging of the central feed tube with condensed $TiCl_4$ vapor.

In operating this modified diffusion-type burner, oxygen saturated with $TiCl_4$ vapor (temperature about 27° C.) is fed through the tube 16 (I.D. about 10 mm.), and a mixture of carbon disulfide and nitrogen vapors is introduced into the flame zone through the inner tube 14. A brief summary of the operating parameters and weights of raw titania Samples A through G is given in Table VII.

TABLE VII.—SUMMARY OF OTHER RUNS FOR PREPARATION OF TITANIA

| Run | Color | $CS_2$, ml. | $TiCl_4$, ml. | $O_2$, c.f.h. | $N_2$, c.f.h. | Time, min. | Crude $TiO_2$, g. |
| --- | --- | --- | --- | --- | --- | --- | --- |
| A[1] | White | 45 | 15 | 8 | 1 | 90 | 6.4 (3.9) |
| B[2] | do | 40 | 20 | 8 | 1 | 95 | 9.0 |
| C | Yellow | 40 | 30 | 9 | 1.5 | 105 | 10.0 |
| D | do | 70 | 20 | 8 | 1 | 100 | 11.5 |
| E | do | 150 | 30 | 4 | 1 | 190 | 10.0 |
| F | do | 100 | 25 | 4 | 1 | 175 | 14.0 |
| G | do | 130 | 25 | 4 | 1 | 235 | 12.5 |

[1] Calcined (ca. 500° C.) for 15 min.
[2] Exposed to air at room temperature.

The amounts of feed materials employed in Runs A through G shown in Table VII correspond to the following approximate molar ratios:

| Feed Material | Approximate Moles Employed in Runs | | | | | | |
| --- | --- | --- | --- | --- | --- | --- | --- |
| | A | B | C | D | E | F | G |
| Carbon disulfide | 0.75 | 0.66 | 0.66 | 1.16 | 2.50 | 1.66 | 2.16 |
| Titanium tetrachloride | 0.14 | 0.18 | 0.27 | 0.18 | 0.27 | 0.23 | 0.23 |
| Oxygen | 7.59 | 8.00 | 10.00 | 8.85 | 8.00 | 7.40 | 9.90 |
| Nitrogen | 1.90 | 2.00 | 3.30 | 2.11 | 4.00 | 3.68 | 4.94 |

All raw titania samples were yellow in color when initially removed from the titania unit. Individual treatments of some of the products of the runs are described below:

The titania of Run A, initially weighing 6.4 g., was calcined in a 250 ml. fused silica flask for 15 minutes with a weight loss of about 39%. The calcining temperature was about 500° C. The titania of Run B was initially yellow in color. The sample was exposed to air in a borosilicate glass beaker for 2 hours with intermittent agitation. The color of the sample gradually changed to white.

The yellow color of the raw titania samples is possibly due to titanium oxychlorides and/or titanium sulfur oxychlorides. The titanous and titanic oxychlorides, both of which are reported in the literature as being yellow compounds, become white upon exposure to air; and, reportedly, are converted to titanic acid. Calcination of these titanium oxychlorides decomposes them into titanium tetrachloride and titanium dioxide. The presence of adsorbed sulfur monochloride, sulfur, and sulfur-oxygen derivatives in the raw titania product collected at room temperature is also a possibility. The elimination of the yellow-colored product may be accomplished in at least two different ways: more complete oxidation of the reactants introduced into the high-temperature flame zone and/or by calcining the raw titania product or by exposing it to moist air.

Example 5

The apparatus and general procedure were essentially the same as described in Example 4. The operating conditions are given below:

| Run | $TiCl_4$, ml. | $CS_2$, ml. | $N_2$, c.f.h. | $O_2$, c.f.h. | Time, min. | Crude $TiO_2$ (g.) |
| --- | --- | --- | --- | --- | --- | --- |
| 5-A | 22 | 60 | 1 | 8 | 138 | 12.5 |
| 5-B | 25 | 130 | 1 | 4 | 207 | 8.5 |

The amounts of feed materials employed in Runs 5-A and 5-B correspond to the following approximate molar ratios:

| Feed Material | Approximate Moles Employed in Runs | |
| --- | --- | --- |
| | Run 5-A | Run 5-B |
| Titanium tetrachloride | 0.20 | 0.23 |
| Carbon disulfide | 1.00 | 2.16 |
| Nitrogen | 2.91 | 4.37 |
| Oxygen | 14.5 | 21.8 |

When a portion of the crude, yellow-colored titania of Run 5-A was calcined for 1 hour at 950° C. there was a weight loss of about 52%. Another portion of the Run 5-A titania was hydrolyzed by the addition of a small amount of water followed by evaporation to dryness at 120° C. When this dried titania was then calcined at 950° C. for 1 hour there was a weight loss of about 34%. A third portion of the run of 5-A was evacuated for 90 minutes at 250° C. under a pressure of 0.1 mm. Copious outgassing of the crude titania was observed at temperatures above 200° C. At the end of the evacuation period the weight loss was about 15%. During evacuation a yellow unidentified material collected on the cooler portions of the evacuation vessel with a lightening of the color of the crude titania that approached white. For qualitative chemical analytical purposes deionized water was added to the evacuation vessel, and the solid was frozen out in the liquid-nitrogen trap of the system. The clear liquid was decanted for analysis. Positive tests were obtained for sulfate, sulfite and chloride ions. No sulfide ion was found, nor was the odor of hydrogen sulfide detected in the acidified portions of the liquid.

A portion of the crude titania of Run 5-B was calcined for 1 hour at 950° C. The loss on calcination was about 34%. Another portion was hydrolyzed, evaporated to dryness and calcined as in the above-described treatment of the crude titania of Run 5-A. The weight loss was about 32%.

The results of the foregoing weight-loss studies and limited chemical analyses indicate that, in the crude titanias of this example, sulfur was present as $SO_2$ and/or $SO_3$ uncombined and/or combined chemically. Chlorine was present either uncombined and/or combined chemically.

Electron micrographs and electron diffraction patterns indicate a large degree of crystallinity in the crude and calcined titanias produced in accordance with this invention, e.g., those prepared as described in Examples 4 and 5. Particle size varies from <500 A. to >10,000 A. in larger aggregates. Particle morphology (shapes) is varied in character, for instance from smooth rounded particles to sharp-edged polygonal structures.

Example 6

This example illustrates the preparation of germanium oxide.

The apparatus employed and the general procedure were essentially the same as previously described in Examples 1 and 2 with reference to the production of $CS_2$-Sil, and as illustrated in FIGS. 1 and 2 of the accompanying drawing.

An admixture of 56 ml. (0.47 mole) $GeCl_4$ and 80 ml. (1.32 moles) $CS_2$ was placed in the glass saturator of the preparation unit. Nitrogen (1 c.f.h.; 5.06 moles) was passed through the saturator, and oxygen (10 c.f.h.; 25.4 moles) was introduced to the burner for 240 minutes. The amount of crude germanium oxide that was collected amounted to 4.5 g. Thirty-two (32) ml. of solution (a mixture of $CS_2$ and $GeCl_4$ richer in the latter than was present in the original charge) remained in the saturator.

The crude germania was a white powder. No $H_2S$ was detected when a small amount of the powder was brought into contact with water, indicating that there was no appreciable amount (if any) of $GeS_2$ in the crude germanium oxide. Volatile contaminants can be removed by calcining the crude germania at temperatures of 400° C. and higher.

Example 7

This example is concerned with the preparation of finely divided alumina, and shows at least qualitatively that finely divided raw alumina can be made from an aluminum perhalide, specifically aluminum trichloride, in a flame reaction utilizing $CS_2$ as an auxiliary fuel.

In this run a mixture of $CS_2$ and $N_2$ was introduced through a 4 mm. tube into the bottom of a fused silica tube having an I.D. of about 12 mm. Aluminum chloride vapor mixed with oxygen was introduced into the aforesaid silica tube through an opening (4 mm. I.D.) located so that the vaporous mixture of $AlCl_3$ and $O_2$ (2 c.f.h.) entered the 12 mm. I.D. fused silica tube at right angles to the flowing stream of gaseous $CS_2$ and $N_2$ (2 c.f.h.). The mixture of aluminum trichloride, carbon disulfide, oxygen and nitrogen reacted inside the fused silica tube to form a bright luminous flame zone. Burner products were collected by agglomeration in a borosilicate glass tube (25 mm. I.D.) approximately 2 feet in length. About a 1-gram sample of raw alumina was produced and collected in this way.

Example 8

This example illustrates the preparation of finely divided boron oxide ($B_2O_3$). In this example, too, the apparatus employed and the general procedure were essentially the same as described in Examples 1 and 2 with reference to the production of finely divided silica and as illustrated in FIGS. 1 and 2.

In producing the boron oxide a mixture of boron trichloride (approximately 0.66 mole), nitrogen (4.22 moles) and carbon disulfide (2.4 moles) was passed into the inner tube 14. Oxygen (10.5 moles) was passed through the outer tube 16. The yield of crude, white boron oxide amounted to 11.5 g.

In another run a mixture of $BCl_3$ (approximately 0.78 mole), nitrogen (6.3 moles) and $CS_2$ (1.6 moles) was passed through inner tube 14 to the burning mixture or flame. Oxygen (15.8 moles) was passed to the aforesaid flame through outer tube 16. Thirteen (13) g. of crude boron oxide in the form of a white powder was obtained.

Volatile by-products of the flame reaction can be removed by calcining the crude $B_2O_3$ at elevated temperatures, preferably below its melting point of approximately 577° C., e.g., at temperatures within the range of 400°–500° C.

Example 9

This example illustrates the preparation of mixed oxides in accordance with the invention, specifically mixed oxides of (a) titania and silica, (b) boron oxide and silica, and (c) germania and silica.

The preparations were accomplished by combining selected metal or metalloid perhalides, specifically perchlorides and/or perbromides, with carbon disulfide, and introducing a preformed vapor mixture thereof into the center of the oxygen stream to create a diffusion-type flame. The apparatus and procedure employed were essentially the same as described in Examples 1 and 2 and illustrated in FIGS. 1 and 2 of the drawing. Oxygen was used in a large excess over the stoichiometrical proportions required for complete oxidation of the perhalide and the carbon disulfide reactants.

The major component of these mixed oxides was silica. The lower limits of concentration (in mole percent) of the minor component were estimated. The estimates were based on mole fraction, vapor pressure and temperature, assuming ideal solution behavior. The upper limit was calculated, assuming that the mole fraction of chloride or bromide initially placed in the saturator uniquely determined the mole fraction of metal oxide in the final mixed oxide samples. The actual level of concentration of the minor metal oxide component is probably best represented by the lower limit. Substantial amounts of the low-boiling chloride or bromide of boron, titanium or germanium remained in the saturator upon the completion of the individual runs.

During preparation of these mixed oxides the saturator temperature was 27° C. Boron tribromide and titanium tetrachloride have vapor pressures of about 68 mm. and 13 mm. at this temperature. The vapor pressure of germanium tetrachloride at 27° C. is about 94 mm.

Tables VIII, IX and X are summaries of operating parameters during the preparation of these various mixed oxides.

TABLE VIII.—TITANIA-SILICA

| Run No. | SiCl₄ ml. | SiCl₄ moles | TiCl₄ ml. | TiCl₄ moles | CS₂ ml. | CS₂ moles | N₂ c.f.h. | N₂ moles | O₂ c.f.h. | O₂ moles | Time, min. | Crude Oxides, g. | TiO₂ Limits, mole percent |
|---|---|---|---|---|---|---|---|---|---|---|---|---|---|
| T-S-1 | 92 | 0.80 | 10 | 0.10 | 100 | 1.66 | 1.5 | 5.68 | 10 | 19 | 180 | 18.5 | 1 to 10. |
| T-S-2 | 60 | 0.52 | 60 | 0.55 | 120 | 1.99 | 1.5 | 5.68 | 10 | 19 | 180 | 13.0 | 10 to 50. |

TABLE IX.—BORON OXIDE-SILICA

| Run No. | SiCl₄ ml. | SiCl₄ moles | BBr₃ ml. | BBr₃ moles | CS₂ ml. | CS₂ moles | N₂ c.f.h. | N₂ moles | O₂ c.f.h. | O₂ moles | Time, min. | Crude Oxides, g. | B₂O₃ Limits, mole percent |
|---|---|---|---|---|---|---|---|---|---|---|---|---|---|
| B-S-1 | 60 | 0.52 | 9 | 0.09 | 70 | 1.16 | 1 | 2.76 | 10 | 11.6 | 110 | 8.0 | 2½ to 7. |
| B-S-2 | 90 | 0.78 | 12 | 0.12 | 100 | 1.66 | 1 | 2.96 | 10 | 14.7 | 140 | 16.5 | 2½ to 7. |

TABLE X—GERMANIA-SILICA

| Run No. | SiCl₄ ml. | SiCl₄ moles | GeCl₄ ml. | GeCl₄ moles | CS₂ ml. | CS₂ moles | N₂ c.f.h. | N₂ moles | O₂ c.f.h. | O₂ moles | Time, min. | Crude Oxides, g. | GeO₂ Limits, mole percent |
|---|---|---|---|---|---|---|---|---|---|---|---|---|---|
| G-S-1 | 90 | 0.52 | 10 | 0.12 | 100 | 1.66 | 1.5 | 5.85 | 10 | 19.5 | 185 | ca. 16 | 3 to 10. |

It will be understood, of course, by those skilled in the art that our invention is not limited only to the production of the finely divided simple and mixed oxides using the particular ingredients, proportions thereof, conditions of operation, etc., set forth in the foregoing examples by way of illustration. Thus, instead of the specific perhalides employed in the foregoing examples, in a similar manner one may use the perhalides, more particularly the perchlorides, perbromides and periodides of tin, zirconium and of other elements of the groups and subgroups of Mendeleev's Periodic Arrangement of the Elements, of which the foregoing elements are members, thereby to obtain the corresponding oxides. Although less desirable for economic and other reasons, one may use compounds, other than carbon disulfide, that are free from hydrogen and wherein the sulfur is bonded directly to carbon, e.g., CSeS or $CSCl_2$ mentioned hereinbefore by way of example. Instead of employing nitrogen as a diluent or carrier gas as in the examples, one may use argon, helium, air or mixtures of air with added nitrogen, argon or helium in any proportions.

Also, instead of using carbon compounds that are free from water-forming substituents, specifically hydrogen, one may use compounds having these characteristics but which contain no sulfur, e.g., carbon diselenide ($CSe_2$).

The finely divided metal and metalloid oxides of the instant invention are useful in applications where such oxides produced by prior methods have been employed, as well as in other applications where their particular and peculiar characteristics render them especially suitable. Thus, it has been mentioned hereinbefore that the higher bulk density of $CS_2$-Sil particles makes them easier to press into shapes for sintering than is the case with the lower bulk density C.A.-Sil particles, which are much more difficult to compact. Such shaped, sintered articles comprised of $CS_2$-Sil are not our invention, being disclosed and broadly and specifically claimed together with method features in the copending application of Edward A. Weaver, Ser. No. 541,391, filed Dec. 16, 1965, now abandoned, filed concurrently herewith and assigned to the same assignee as the present invention. As pointed out more fully in this Weaver copending application, the unusual and unobvious properties of $CS_2$-Sil makes this silica eminently suitable for use in the production of shaped, solid, sintered, silica-containing articles of manufacture.

By "sintered" article or the like as used herein it is generically meant, as likewise in the aforementioned Weaver application, that the particles, e.g., silica particles, of which the product or article is made have been united to form a solid mass in which the said particles have lost their particulate form. It is intended to include (unless a different or more specific meaning is clear from the context) both solid masses wherein the particles are united together mainly by surface-melting or -fusion of the individual components to form a coalesced mass, as well as those solid masses wherein the individual particles have melted sufficiently so that a vitreous mass is obtained. Also, by "sintering" temperature, temperature range or the like as used herein is meant that temperature or temperature range necessary to obtain the aforementioned "sintered" product or article.

As will be apparent to those skilled in the art, modifications of the present invention can be made or followed in the light of the foregoing disclosure without departing from the spirit and scope of the disclosure or from the scope of the claims.

We claim:

1. In a process for preparing a finely divided metal or metalloid oxide by the vapor phase decomposition of a metal or metalloid perhalide. the improvement which comprises introducing said perhalide into a flame produced by the combustion of non-water-forming combustible gases which include an oxidizing gas and a flame temperature increasing auxiliary fuel consisting of a hydrogen-free compound containing sulfur bonded directly to carbon, the amount of oxidizing gas being in excess of the theoretical stoichiometric amount required for complete oxidation of the perhalide to the corresponding oxide and for complete combustion of the auxiliary fuel, and then recovering the resulting finely divided metal or metalloid oxide.

2. The process of claim 1 wherein the auxiliary fuel is selected from carbon disulfide, carbon selenide sulfide, and carbon thiophosgene.

3. The process of claim 2 wherein the perhalide is selected from silicon tetrachloride, titanium tetrachloride, germanium tetrachloride, boron trichloride, boron tribromide, and aluminum trichloride.

4. The process of claim 3 wherein the oxidizing gas is an oxygen containing gas.

5. The process of claim 3 wherein the oxidizing gas is selected from air and oxygen.

6. In a process for preparing finely divided silica by the vapor phase decomposition of silicon tetrachloride, the improvement which comprises feeding the silicon tetrachloride into a flame produced by the combustion of non-water-forming combustible gases consisting essentially of carbon disulfide and an oxidizing gas, the carbon disulfide and silicon tetrachloride being employed in a molar ratio of at least about .2 mole of carbon disulfide per mole of silicon tetrachloride, and the amount of the oxidizing gas being in excess of the theoretical stoichiometric amount required for complete oxidation of the silicon tetrachloride to $SiO_2$ and the carbon disulfide to $CO_2$ and sulfur oxide(s), and then recovering the resulting finely divided crude silica.

7. The process of claim 6 wherein a mixture of silicon tetrachloride and carbon disulfide is fed into the flame.

8. The process of claim 7 wherein the mixture includes a diluent gas.

9. The process of claim 8 wherein the diluent gas is nitrogen.

10. The process of claim 9 wherein the carbon disulfide and silicon tetrachloride are employed in a molar ratio of about .2 to about 4 moles of carbon disulfide per mole of silicon tetrachloride.

11. The process of claim 6 wherein the recovered silica is calcined at a temperature and for a time sufficient to remove therefrom volatile by-products of the flame reaction, but insufficient to sinter the silica into a solid mass such that it loses its finely divided form.

(References on following page)

References Cited

UNITED STATES PATENTS

| | | | |
|---|---|---|---|
| 2,823,982 | 2/1958 | Saladin et al. | 23—182 |
| 2,990,249 | 6/1961 | Wagner | 23—142 |
| 3,275,412 | 9/1966 | Skrivan | 23—202 |

OTHER REFERENCES

Holmgren et al., "Journal of the Electrochemical Soc.," vol. III, No. 3, March 1964, pp. 362–369.

OSCAR R. VERTIZ, *Primary Examiner.*

H. T. CARTER, *Assistant Examiner.*

U.S. Cl. X.R.

23—21, 140, 142, 149, 202